United States Patent Office 3,045,571
Patented July 24, 1962

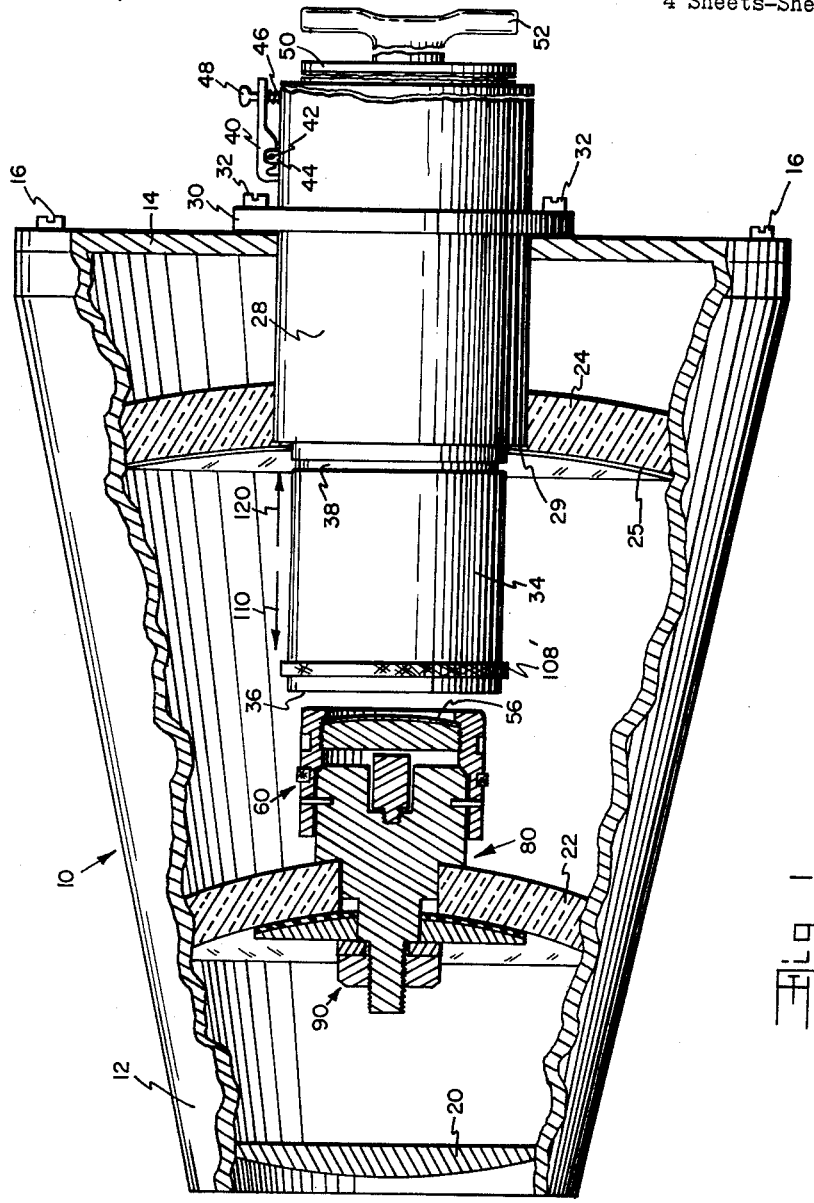
INVENTOR.
NELSON F. MURCKO

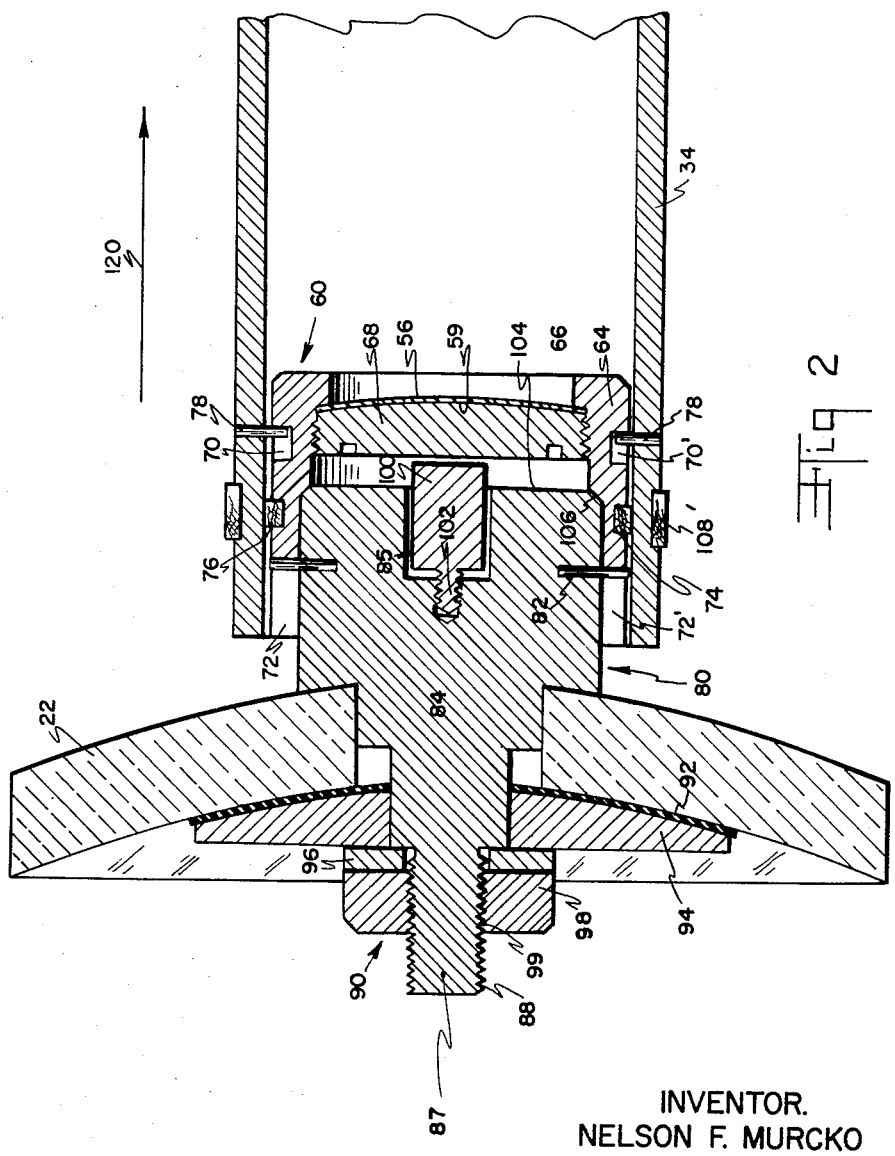

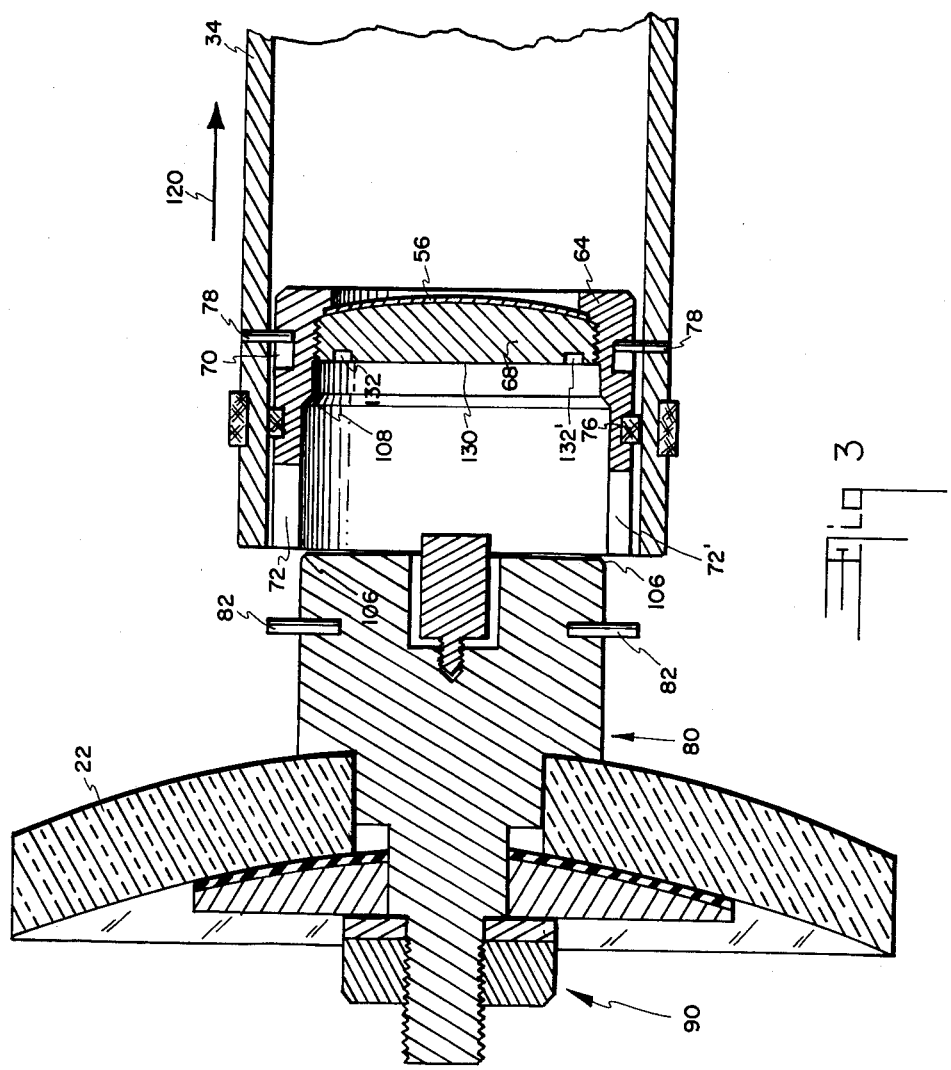

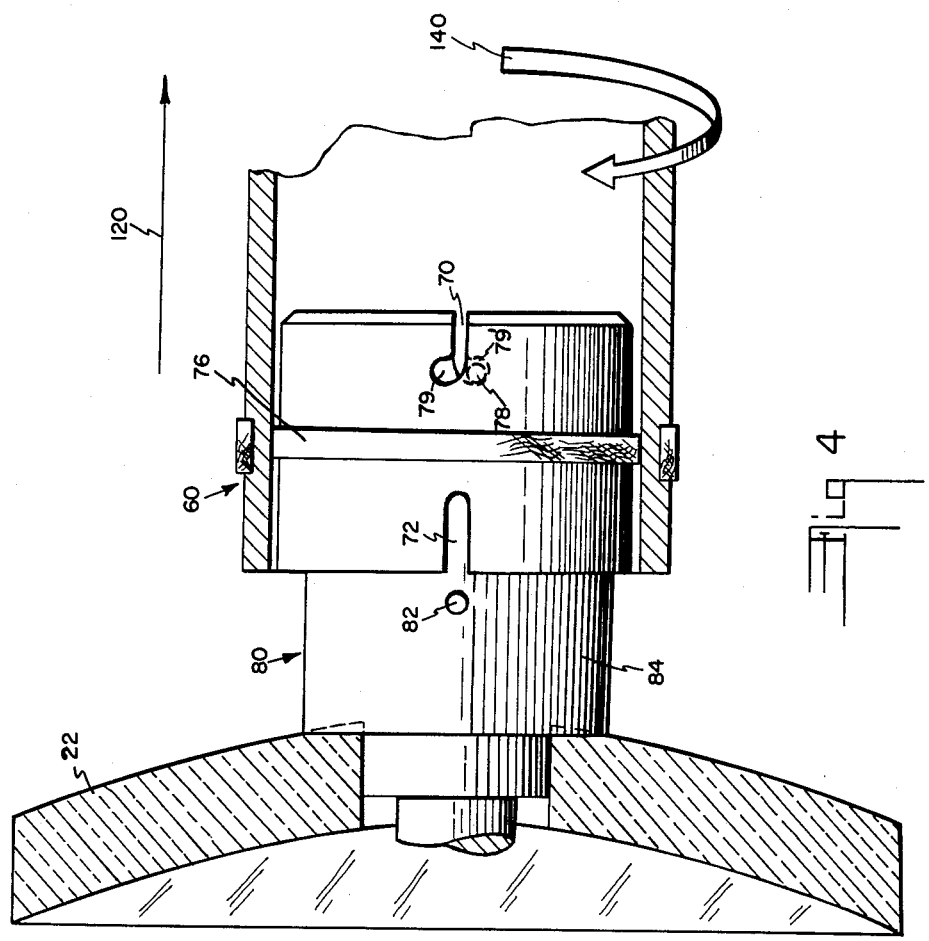

3,045,571
MAGNETIC SHEET FILM LOADER
Nelson F. Murcko, Stratford, Conn.
Filed June 17, 1960, Ser. No. 36,893
11 Claims. (Cl. 95—11)

This invention relates to a daylight sheet-film loader and holder for a still camera. More specifically, the invention provides a magnetic film loader and holder for a camera in which the film plane is highly inaccessible.

Ever since Schmidt designed the first successful catadioptric camera, it has been recognized that this type of optical system has great advantages over a purely lensatic optical system for photographic purposes. The major advantage of using a Schmidt (or other catadioptric) objective is that the optical system can thereby be made much "faster" (i.e., of great light-gathering ability) without undue aberrations or unmanageable bulk and weight. However, catadioptric cameras have not been successful commercially, except for special laboratory and scientific uses. One of the prime reasons for the comparative disuse of these high-speed catadioptric cameras has been the difficulty of loading and unloading the film therein, since typically the image plane is located between the optical elements.

The present invention obviates this disadvantage of difficult loading, and thus allows the using of a Bouwers-type (modified Schmidt) catadioptric-system of extremely fast lens-speed in a still camera without the usual film-changing problems. For example, the illustrated Bouwers-Schmidt camera has a lens speed of F/0.83 but, nevertheless, may be loaded in daylight without any special precautions or darkroom equipment. Of course, the present invention is not limited to use in Schmidt (or modified Schmidt) cameras, but, rather, is useful in other catadioptric objective cameras (such as those of the Cassegrainian type) and, indeed, even in wholly lensatic cameras, where the film plane is relatively inaccessible.

The invention accomplishes the loading and replacing of a sheet film in the camera's image plane by means of a sliding tube, releasably holding (by means of a bayonet pin and slot connection, for example) the loaded film holder. The tube is introduced through an exterior wall of the camera, thus positioning the sheet-film holder generally at the camera image plane. The tube is then twisted to disengage the bayonet connection, while the film holder is held from rotation by a stationary second pin and slot, so that the film holder is released. The sheet-film holder is thereafter held in the image plane by a second releasable holding means, permanently located at the image plane of the camera, the preferred second releasable holding means being an alnico magnet. The loading tube may then be retracted, while the film holder is retained at the image plane, so that an exposure may be made.

When it is desired to replace the film, the tube is again moved back, and then the film holder is re-engaged by twisting the bayonet connection into the lock position again. The film and film holder, again connected to the tube, can then be extracted from the camera through the housing. It should be noted that the tube, which acts as the positioning means for the film holder, also acts to make a light-tight package therewith when the film holder is bayonet-joined thereto so that the film will not be light-struck upon removal from the camera.

An object of the invention, therefore, is to provide a sheet-film loader assembly for a camera having an inaccessible film image plane.

A further object of the invention is to provide a daylight loading, film holder and loader assembly for the above purpose.

Another object of the invention is to provide a magnetic film loader and holder for a catadioptric-type camera.

A further object is the provision of a daylight film loader for a still camera, in which a retractable loading tube releasably supports the film holder, the latter being held in "taking" position at the film plane by a second releasable means, so that the tube may introduce the film holder into taking position, then be withdrawn, and leave the film holder retained at the taking position by the second releasable means.

Another object is the provision of a daylight film loader for a still camera in which a retractable loading tube releasably supports a film holder, made at least in part of ferro-magnetic material, which is subsequently releasably held in "taking" position by a magnet, so that the tube may introduce the film holder into the film plane and then be retracted, leaving the magnetically-held film holder at the taking position.

Other objects and features of the invention will be obvious to one skilled in the art upon reading the following specification and after perusing the preferred embodiment of the invention, hereinafter described and illustrated in the accompanying drawing, in which:

FIG. 1 is a partly cutaway elevation, part vertical section of a catadioptric camera showing the sheet film and the film holder in "taking" position, and with the loading tube slightly separated therefrom;

FIG. 2 is a cutaway vertical section of the loaded film holder with it about to be changed, so that the magnet is still holding it in the "taking" position but with the loading tube also engaged therewith, in position to withdraw the film and its holder from the magnet;

FIG. 3 is a similar vertical section, but showing the film and film holder connected to the loading tube, substantially free of the field of the magnet and about to be withdrawn from the taking position; and FIG. 4 is a horizontal half-section, looking downwardly in FIG. 3 but with the loading tube partly broken away to show more clearly the film holder being separated from the magnet and the releasable pin and bayonet slot connection between the film holder and the loading tube as well as the stationary second pin and second slot means for holding the film holder from undesired rotation.

It should be noted, at the outset, that the drawings are not to scale and, in all the figures, the diameters of the central, tubular, film-loading assembly elements and all the central elements associated therewith have been purposely exaggerated in order to show more clearly the details of these elements. Therefore, the actual diameters of the optical elements shown in FIG. 1 are proportionally much greater in respect to these central elements than shown in the drawings, so that the loading tube, the film holder, and all the supporting elements therefor do not actually obstruct any major portion of the area of the optical elements in the camera as actually built.

Thus, FIG. 1 of the drawing implies a ratio of loading tube support sleeve diameter to main (Schmidt) mirror useful diameter of about 2:5 (i.e. obstruction ratio of 2/5). Actually, the dimensions of a preferred embodiment are: loading tube support sleeve (element 28) outer diameter=about 2⅝ inches; main (Schmidt) mirror (element 24) outer diameter=about 10 inches; main (Schmidt) mirror (element 24 useful diameter (i.e. "clear aperture")=about 9⅝ inches.

Therefore, the obstruction ratio is really only about ¼, using the overall outer diameter of the Schmidt mirror, or only 3/11, using the useful diameter of the Schmidt mirror as the denominator. Since the obstructed area of the mirror is, of course, proportional to the square of the obstruction ratio, the actual obstructed area of the mirror is only about 6¼% (using the outer mirror diameter) or 7½% (using the clear aperture diameter), and not the 16% suggested by the drawing. Since the other film-holding mechanical elements are also proportionally smaller, all of the optical system can be utilized much more fully than would be inferred from the showing of the camera in the drawing.

In FIG. 1, the Schmidt-type catadioptric camera 10 is shown as comprising a tapered tubular housing 12 and a back plate 14 connected thereto by means of screws 16. Inside the tapered tubular housing 12 are mounted the three optical elements comprising a Bouwers-type catadioptric objective system for the camera. Specifically, lens element 20, hemispherical shell 22, and concave spherical mirror 24, having a metallic reflective coating 25 on the concave surface thereof, form together the camera objective. Light entering from the left into the tapered tubular camera body is partly converged by lens 20, passes through and is refracted by spherical shell 22, and is then reflected by concave spherical mirror 24 to form an image at the film plane of the camera. The main optical element is, of course, spherical mirror 24 which does most of the converging and focusing of the entering light. The purpose of spherical shell 22 is to correct the spherical aberration of the concave mirror 24; and the purpose of lens element 20 is to correct the chromatic aberration caused by the spherical shell 22.

Hollow cylindrical sleeve 28 is attached to back plate 14 by means of integral circular flange 30 and screws 32. This hollow sleeve 28 assists in supporting the spherical mirror 24, and also supports in its interior the slidable loading tube 34, hereinafter more fully described. In normal operating or "taking" position, the loading tube 34 is withdrawn to the right a considerable distance beyond that shown in FIG. 1, so that its left-hand end 36 is, more or less, coplanar with the left-hand end 29 of sleeve 28. The slidable loading tube 34 is maintained in its right-hand-most or retracted position by means of circumferential slot 38 formed therein being engaged by latch 40. Latch 40 is rotatably supported on pivot 42 by means of ears 44 struck up from the hollow sleeve 28. Spring 46, pushing up on the right end of latch 40, tends to maintain the left-hand end of latch 40 in the downward or engaged position with slot 38 when the tubular loading member 34 is in its retracted position; but push button 48, rigidly attached to the right-hand end of latch 40, enables the operator to disengage the latching portion of latch 40 from said slot 38 when it is desired to move the tube from its retracted position. The right-hand end of loading tube 34 is sealed by screw-thready engaged plate 50, which also carries T-shaped handle 52. Handle 52, of course, facilitates the operator's sliding of loading tube 34.

Film 56 is supported in the image plane of the optical system by means of film holder 60, hereinafter more fully described. The film holder 60 is supported by means of permanently located, film-holder support 80, which in turn is supported on the spherical shell 22 by attaching means 90. Assemblies 60, 80 and 90 are best shown in FIG. 2.

In FIG. 2, the film holder assembly 60 is shown as comprising tubular film holder element 64, which has integral film-retaining flanges 66 overlying the film 56 to keep the film from moving towards the right as viewed in FIG. 2. The means for holding the film against the flanges 66 is threaded, hemispherical film platen 68, which engages in the threads of the tubular film holder element 64 and is capable of being screwed tightly against the back of the film 56 to firmly hold the film in a spherical shape in the similarly curved image plane of the optical system forming the objective of the camera. For this purpose, the film-contacting surface of the threaded circular film platen is spherically shaped as shown at 69 in FIG. 2.

The cylindrical peripheral surface of the tubular film holder element 64 contains two pairs of slots, 70, 70' and 72, 72'. Slots 70 and 70', which differ from each other only in being mirror-images of each other, are of the bayonet type and are more clearly seen in FIG. 4. Also in FIG. 4, it can be seen that slot 72 is formed (as is similar slot 72') through an edge surface of the tubular film-holder element 64 so that the slot is U-shaped and therefore completely open at its left-hand end. A shallow groove 74 (see FIG. 2) is also formed in the outer cylindrical surface of element 64 and a felt ring 76 is positioned in groove 74 in order to light-tight element 64 and sleeve 34, as will be more evident hereinafter.

In the position of the film holder 64 and loading tube 34 shown in FIG. 2, pins 78, which are tightly press-fitted into the loading tube 34, engage in the bayonet slots 70, 70' of the tubular holder 64 so that the film holder and the tube 34 are releasably connected. In looking at FIG. 4, it is obvious that these pins 78 are capable of releasably attaching loading tube 34 to the film holder 64 by means of the bayonet slots 70, 70' therein. This attaching is accomplished by manually turning handle 52 thereby to rotate the loading tube 34 and thus the rigidly attached pins 78 into the locking portions 79, 79' of the slots 70, 70'.

In order to maintain the film holder 64 non-rotatable during this locking of the bayonet connection between pins 78 and slots 70 and 70', pins 82, rigid with the stationary film-holder support element 84, engage in U-shaped slots 72, 72' of the tubular holder 64 (see FIGS. 2 and 4). Since support element 84 is non-rotatably and immovably connected to the stationary spherical shell 22 by means of attaching-nut assembly 90, pins 82 are held stationary and therefore constrain film holder 64 from rotation when the pins are engaged in slots 72 and 72' therein (see FIG. 2).

The attaching-nut assembly 90 comprises a thin rubber pad 92 held tightly against spherical shell 22 by means of spherical washer 94, which in turn is pressed to the right (in FIG. 2) by means of a conventional hexagonal nut 98 working through an ordinary flat washer 96. The internal threads 99 of nut 98 tightly engage the exterior threads 88 formed on the reduced, left-hand end 87 of stationary film-holder support 84, thereby mounting said support rigidly and non-rotatably. Of course, an additional lock-nut or other conventional means may be used in conjunction with nut 98 for this purpose.

In addition to carrying pins 82 in the exterior surface thereof, film-holder support element 84 also rigidly carries, in a central tubular recess 85 therein, a cylindrical alnico magnet 100. The magnet 100 is anchored in aperture 85 by means of an integral threaded lug 102 thereof being screwed into threaded socket 86 formed in the bottom (i.e. left-hand end in FIG. 2) of recess 85 in film holder support element 84. Alternatively magnet 100 may be a conventional horseshoe magnet attached by means of a screw passing through an aperture made in the joint portion of the U-shaped legs thereof.

When pins 78 of loading tube 34 are not exerting any restraining force on the bayonet slot 70 in tubular film holder element 64, the magnet will attract the entire film holder assembly 60 to the left into the seating position shown in FIGS. 1 and 2. Locating portions 106 of the curved right-hand surface 104 (see FIGS. 2 and 3) of the stationary film-holder support 84 engage locating shoulder 108 (see FIG. 3) formed on the internal surface of tubular film holder 64, thereby to locate precisely the film holder and the film at the desired point, i.e. at the image plane of the catadioptric camera objective. In order to preserve the magnetic flux strength of magnet 100, adjacent elements 84, 34 and 64 are preferably made of a non-magnetic permeable material, while element 68 is of ferro-magnetic material and therefore, of course, magnetically permeable.

The operation of the novel sheet-film loader is best understood by referring back to FIGURE 1. Let it be assumed that a picture has just been taken, so that the film 56 is now exposed. The operator, by grasping T-handle 52, has already slid the loading tube 54 substantially all the way to the left, as indicated by arrow 110 in FIG. 1. Further manual pushing on handle 52 will position the tube 34, so that pins 78 carried thereby will engage in bayonet slots 70, 70′ in the tubular film holder 64 (see FIGURE 2). A slight twist of the T-handle 52 in the direction of arrow 140 (see FIG. 4) will then make the pins 78 pass into locking portions 79, 79′ of the bayonet slots 70 and 70′, while the pins 82, still engaged in slots 72, 72′ in the other end of the film holder, restrain the holder from rotation.

The above simple pushing and then twisting of T-handle 52 thus accomplishes the connection of the tubular film-holder 64 to the sliding loading tube 34. A straight pulling on the handle 52 to the right (in FIG. 1) will move loading tube 34 in this direction as shown by the arrow 120 in each of FIGS. 1, 2 and 3. Since the entire film holder assembly 60 is now firmly connected to the loading tube 34 (by the bayonet connection of pins 78 and slots 70, 70′) the holder and the film 56 are pulled away from the attraction of magnet 100, solely operative on the nearest element (i.e. hemipspherical platen 68) of the film holder 60. The holder 60 and the film are, therefore, first moved into the position shown in FIG. 3 and then moved further and further to the right (see arrow 120 in FIG. 3). Once the loading tube 34 has been fully pulled to the right (see FIG. 1), spring-loaded latch 40 will engage in groove 38 to lock releasably the tube in this retracted position with the left-hand edge 36 of the tube substantially at the left-hand end 29 of sleeve 28. In this position, circular felt ring 108′, shown as positioned in a shallow peripheral groove 109 (see FIG. 3) in the outer cylindrical surface of loading tube 34, will act to light-tight said tube in respect to the adjacent inner surface of stationary cylindrical sleeve 28. Preferably the circular felt ring is actually attached inside (not shown) sleeve 28 in a shallow-groove therein, but has been shown on tube 34 for the sake of clarity.

Manual depression of latch push-button 48 releases latch 40 from groove 38 so that the whole loading tube with the film-holder assembly 60 therein may be removed from the camera. It should be noted that felt ring 76, carried in external circular groove 74 in the outer surface of tubular film-holder 64, light-tight the clearance space between said outer surface and the internal cylindrical surface of loading tube 34. Since hemispherical film platen 68 light-tights the left end of tubular film holder 64, and end plate 50 light-tights the right-hand end of loading tube 34, the film is completely protected from light by these elements, even though the loading tube and film holder are withdrawn from the camera. The whole assembly may therefore be handled without any special precautions as to light striking the film.

An unexposed film may then be substituted for the exposed film in the film holder 60 in at least two different ways. One method is to take the whole loading tube assembly, with the holder therein containing the exposed film, into a dark-room and to unscrew the hemispherical film platen 68 from the tubular holder element 64. For this purpose, the left-hand surface 130 of hemispherical platen 68 is provided with a plurality of rectangular indentations 132, 132′, etc. (see FIG. 3), spaced about a generally circular path in said surface 130. A tubular tool of the pin wrench type can then be used to unscrew the platen from the film holder without disassembling the film holder assembly from the loading tube. After removing the platen, a fresh, unexposed sheet film is then substituted for the exposed one, and the platen screwed back tight again, using the same tubular-wrench tool. The whole loading tube assembly may then be taken into the light and, at the operator's leisure, loaded into the camera.

Another method of changing film in the loading tube assembly is simply to take the whole assembly with the exposed film into a dark-room, and there to disengage the bayonet and slot connection between the film holder 60 and the loading tube 34 (a tool having fixed pins introduced into slots 72 facilitating the holding of the holder 64 during this operation). Then a new film holder assembly 60 (i.e. elements 64, 68, and 76) loaded with a fresh film 56 is bayonet-latched into the loading tube in place of the old assembly having the exposed film, after which the freshly-loaded tube may be taken out into the light and loaded into the camera at the operator's leisure.

Of course, in each of the above methods, a few duplicate sets of film-loading tubes 34 and film holder assemblies 60 should be supplied with each camera. If the first (i.e. removing only the film platen method) way of exchanging film is used, then the same number (say, five) of loading tubes and film holder assemblies should be furnished with each camera. Should the operator prefer the second method (i.e. interchanging whole film holder assemblies), then a smaller number of loading tubes (say, three) and a slightly greater number (say, eight) of film holder assemblies would be more appropriate for each camera. In either event, the camera may be utilized to take a plurality of pictures, without any darkroom being in the near vicinity, simply by having on hand a number (i.e. five or so, depending on the frequency of use of the camera) of already freshly loaded film holder and loading tube assemblies.

Of course, either method of replacing the film in the film loader assembly, described above, does not require an actual dark-room (as that term is generally used in the art), but, rather, a black light-tight bag having light-tight arm holes, kept available near the camera, may be used for this purpose. By use of such a commercially available bag, either of the above procedures for changing the film in the loading tube may be performed at the camera after each exposure so that only one or two loading tubes 34 need be supplied with each camera.

Where the first method (i.e. removing only the hemispherical film platen 68) is used, no duplicate elements, besides a spare film platen, need be supplied when using such a film-changing bag. Thus, an unexposed sheet film from a stack, kept in a particular part of the bag (say, the lower right-hand corner), may be put into the film holder after the exposed film sheet has been dropped in, say, the left-hand corner of the bag. Then the operator may screw the same or the spare hemispherical platen 68 into the end of the tubular holder 64 (all these manipulations being, of course, done inside the changing bag), thereby utilizing only one tube and film holder assembly and only one or two film platens for each camera. Preferably, however, two tubes and film holder assemblies are used in tandem with each camera, so that one tube, loaded with fresh film, is available at all times.

On the other hand, only one loading tube need be supplied when a changing bag is used for the second film loading method (i.e., changing the whole film holder assembly 60 by means of the releasing of the bayonet connection between said assembly element 64 and the loading tube 34). In this method, additional film holder assemblies have to be supplied, of course, so that there are available (in, say, one corner) in the bottom of the bag, a few film holders 60 having unexposed film therein, while the exposed ones can be dropped into a different part of the bag. This procedure must also, of course, be done with the operator's hands and the loading tube totally inside the dark bag. Although this process allows the use of only one loading tube, it may be preferred here also to shuttle back and forth from camera to bag two such tubes so that a freshly loaded film holder and tube assembly is always at hand.

By either of the above two film-changing bag techniques, the number of extra holder and tube assemblies is kept to a minimum, thus obviating the expense of additional duplicate elements, while still having available at all times use of the expensive catadioptric camera.

The repositioning of the freshly loaded film holder 60 into the camera by means of the loading tube 34 is accomplished in substantially the opposite manner to the unloading of the exposed film and its holder, described earlier. Specifically, the loading tube having film holder assembly 60 (containing fresh film 56) is introduced into the central opening in the right end of sleeve 28 and then pushed to the left (see FIG. 1) by means of T-handle 52. As slot 38 reaches the point under the nose portion of latch 40, the latch would tend to fall into the slot because of spring 46. The right-hand part of this nose portion of latch 40 is, however, preferably chamfered to allow the right-hand wall of slot 38 to force the latch nose up over this wall, so that latch 40 does not restrain the loading tube from being pushed in the left-hand direction (see arrow 110 in FIG. 1). The tube is pushed in this (arrow 110) direction until the loading tube passes through the position shown in FIG. 3 and to the position shown in FIG. 2.

As the film holder assembly 60 approaches the FIG. 2 position, magnet 100 attracts the magnetically permeable, ferro-magnetic material in platen 68 to seat firmly film holder element 64 against film holder support 84. As this seating takes place, locating portions 106 of the support guide the holder element 64 and finally stop said element in precise alignment and position by acting against locating shoulder 108 therein. It should be noted that this final seating is accomplished more or less automatically, and requires precision machining of only the locating portions 106 and the locating shoulder 108. It can also be seen from FIG. 2 that the magnet never actually contacts the magnetically permeable material of the film platen 68 so that subsequent separation thereof (for reloading) does not require any sudden jerk or undue initial force. Once the film holder assembly has been firmly seated with the aid of magnet 100, twisting of the T-handle in the direction opposite to that shown by arrow 140 (in FIG. 4) will disengage the pins 78 from the locking portions 79, 79' of bayonet slots 70, 70'. As before, stationary pins 82 seated in U-shaped slots 72, 72' in holder element 64 keep the film holder assembly 60 from turning during this unlocking operation.

Since the loading tube and the film holder assembly are now disengaged, the loading tube may be withdrawn to the right (see arrow 120) through the position shown in FIG. 1. As the left-hand end 36 of the loading tube reaches the left-hand end 29 of the stationary sleeve 28, latch 40 engages in groove 38 to stop further withdrawal of the loading tube. The camera is now ready for taking a picture, since the loading tube no longer interferes with the optical system in any way.

It should be noted that additional felt rings similar to that shown at 108' are preferably positioned at longitudinally spaced points in the interior of sleeve 28 so that at least one of the rings sealingly engages with the exterior of tube 34 no matter at what point in its travel the loading tube may be.

The invention thus provides a way of loading and unloading a catadioptric or other inaccessibly-located film-plane camera wherein the operator executes a simple push-pull and twist of the wrist for each operation. No disassembly of the critically mounted optical elements is required, nor is it necessary to move their mechanical supports in any manner.

Although I have described a specific physical embodiment and only a few modes of operation, the invention is obviously not limited to the structural details or even to preferred modes of operation. Rather, the inventive concept is providing convenient loading of sheet film in an inaccessible film-plane, still camera by a pair of releasable connections of the film to a support and to a movable loading member, respectively. Therefore, I do not wish to be limited to the embodiment illustrated or the methods of use herein described, but wish to encompass all features thereof singly and in combination, and all modifications thereof which will occur to those normally skilled in the art upon seeing this disclosure. Therefore, this patent is intended to cover the subject matter of any and all of the following claims and their equivalents.

I claim:

1. A sheet-film loading assembly for a still camera comprising: an elongated loading member having a releasable film-holder support means at one end thereof; a film holder having, on one portion thereof, a first connection means adapted to interengage in a releasable manner with said releasable support means; said film holder having, on another portion, a second connection means adapted to connect releasably with a stationary second releasable support means located near the image plane of a camera; said loading member and film holder, when operatively connected together, forming a light-tight assembly so as to protect the film which may be present in the film holder; said assembly being, however, readily separable so as to allow the film holder, when it is connected to said stationary second support means, to be released from said loading member, so that the loading member may introduce the film holder adjacent to the image plane of the camera and then be disconnected from said film holder so as thereafter to be withdrawn from any interference with the optical path of the image of the camera objective.

2. A sheet-film loading assembly according to claim 1 in which said second connection means comprises a magnetically permeable member adapted to be mutually attracted to another magnetically permeable member forming said second support means, when, either of said magnetically permeable members is magnetized.

3. A sheet-film loading assembly according to claim 1 in which a readily graspable means is located adjacent to the other end of said elongated loading member to facilitate manipulation of the loading member.

4. A sheet-film loading assembly according to claim 2 in which the first connection means and the first support means are engageable in such a manner as to be capable of being connected and disconnected by movement of the graspable means, remotely located at the other end of said loading member.

5. A sheet-film loading assembly according to claim 1 in which said first connection means and said first releasable support means form together a bayonet pin and slot connector.

6. A sheet film loading mechanism for a still camera of the type having a light-tight housing, an optical system and a shutter, said loading mechanism comprising: bearing means formed in an aperture of the housing of the camera for movably supporting a slidable member; a movable generally elongated loading member mounted in said bearing means and forming therewith a light-tight seal in at least a continuous portion of its continuous movement, the one end of said loading member which normally enters into the interior of the camera housing having a first releasable support means for sometime connection to a film holder; a film holder adapted to be interchangeably carried by said support means; a stationary second releasable support means for said film holder positioned adjacent to the image plane of the camera optical system and adapted to support said film holder sometimes in such position as to locate the film carried therein at said image plane; said first support means being so located that, in at least one position of said slideable loading member, it is capable of being connected to said film holder while the latter is simultaneously connected to the second support means; the first support means connection being so designed as to be operable by manipulation of the other end of the loading member which normally protrudes outside of the camera, so that the film holder may be alternately connected and disconnected to said loading member, thereby allowing said stationary second support means to solely maintain the film holder sometimes at the image plane, thus allowing the loading member to be moved out of physical interference with the optical system ray path when a picture is to be taken.

7. The sheet-film loading mechanism according to claim 6, in which the second support means has associated therewith means for constraining the film holder from undesired motion when the disconnection of the loading member therefrom is being effected.

8. The sheet-film loading mechanism according to claim 7 in which the elongated loading member is substantially tubular; the first releasable support means at the one end thereof comprises one part of a bayonet pin and slot means; and the film holder has the other, complementary part of the bayonet means, so that a rotary motion of the loading member relative to the film holder acts to connect and disconnect the tubular loading member and the film holder, thereby making the only required manipulative operation of the other end of the loading member substantially a pushing and pulling combined with a twisting motion of the operator's arm.

9. The sheet-film loading mechanism according to claim 6, in which said stationary second releasable support means comprises a magnetically permeable part, an adjacent part of the film holder is also of magnetically permeable material, and at least one of said magnetically permeable parts is magnetized so that they mutually attract when in proximity to each other.

10. The sheet film loading mechanism according to claim 6, specifically adapted for a catadioptric camera, in which said housing mounts a mirror forming part of the optical system of the objective of the camera, said bearing means being partly formed in an aperture in said mirror, so that the loading member may introduce the film holder and its contained film beyond the mirror to the operative, image-plane side thereof, and subsequently be retracted to the non-operative side so that the film is left in the image plane of the mirror but the loading member is not in the path of either the incident or reflected rays reaching and leaving, respectively, said mirror.

11. A sheet-film loading mechanism according to claim 6, in which a latching means is supplied to prevent accidental full removal of the loading member from the camera, said means being manually disengageable so as to allow the loading member to be fully retracted from the camera when removing the exposed film therefrom.

References Cited in the file of this patent

UNITED STATES PATENTS 2,360,871      Griswold _____ Oct. 24, 1944